Aug. 21, 1945.   E. F. PAWSAT   2,383,273
STEERING POST
Filed May 26, 1944
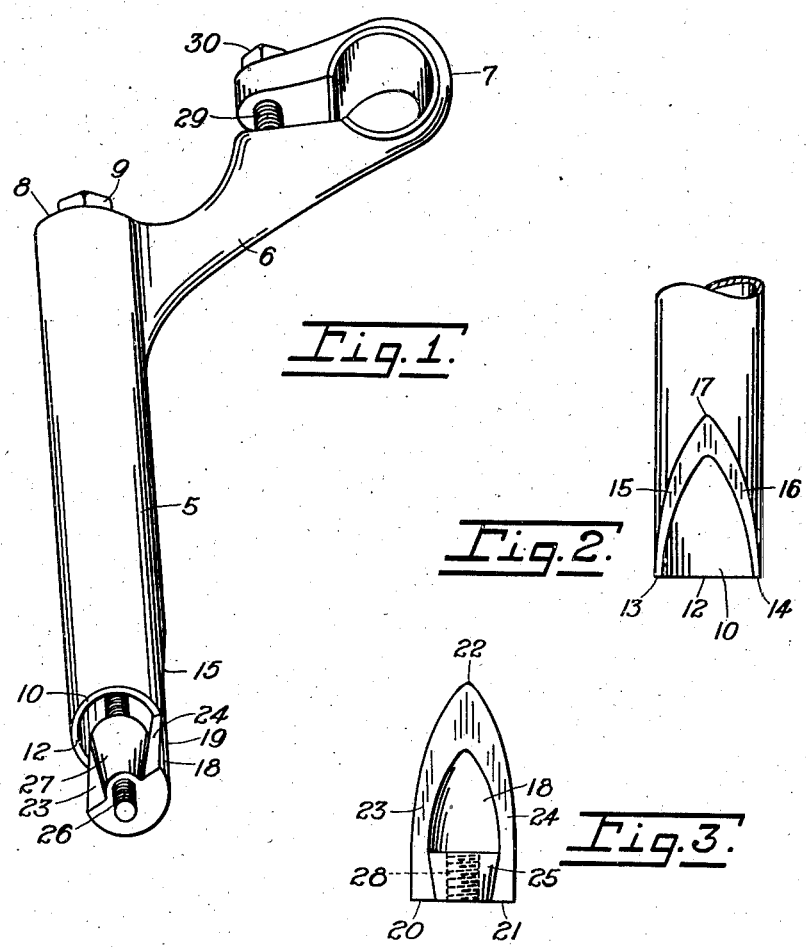
INVENTOR,
Ewald F. Pawsat,
BY
Zugelter + Zugelter
Atty's.

Patented Aug. 21, 1945

2,383,273

UNITED STATES PATENT OFFICE 2,383,273

STEERING POST

Ewald F. Pawsat, Maysville, Ky.

Application May 26, 1944, Serial No. 537,429

6 Claims. (Cl. 287—54.1)

This invention relates to a steering post for cycles, and concerns particularly that type of steering post which includes clamping means at its lower end adapted to be expanded within the hollow stem of the steering fork, for establishing the steering connection.

An object of the invention is to provide an improved steering post with clamping means of great durability and clamping power, but which is not subject to distortion under intense strain.

Another object is to establish an effective area of clamping friction between the post and the surrounding fork stem, which is firm and stable at all points, so that the full force of the clamping action is maintained and utilized for securing the parts against relative movement.

The foregoing and other objects are attained by the means described herein and illustrated in the accompanying drawing, in which:

Fig. 1 is a perspective view of the improved steering post in assembled condition, ready for insertion into a hollow fork stem.

Fig. 2 is a fragmental elevational view of the lower end of the post proper.

Fig. 3 is an elevational view of the clamping nut or wedge.

The improvement to which the present invention relates, is concerned with the lower end of a cycle steering post, where expansive means are provided for adjustably fixing the steering post within the hollow stem of a steering fork. In the past, certain weaknesses were evident in the clamping means, which the present invention has successfully obviated. The weaknesses have been overcome without increasing the bulk and weight of the metal utilized in the clamping means, and in fact, metal has been conserved in adopting the structural changes hereinafter to be described.

Referring to the drawing, the character 5 indicates a hollow steering post having near its upper end an extending arm 6 which carries the conventional handle bar clamp 7. The upper end 8 of the post is apertured to receive the shank of a long clamping bolt, the angular head of which is indicated at 9. The bolt head bears on the top of the post marginally of the bolt aperture, to limit longitudinal movement of the bolt into the post.

The steering post 5 is provided with a blunt stub end 10 having a peripheral edge 12 lying in a plane substantially at right angles to the longitudinal axis of the post. The extent of the peripheral edge may approximate a half circle.

From the corner points 13 and 14 of the blunt stub end, the post is cut away along an oblique line, to provide wedge surfaces 15 and 16 lying in a common plane oblique to the post axis. The wedge surfaces coincide at a point 17 on the outer curved surface of the post, at a distance from the peripheral curved edge 12.

A clamping nut or wedge indicated generally by the character 18, is formed of a part-circular tube or rod of approximately the same diameter as the post, with a frictional area 19 extending part way around the circumference. As shown in the drawing, said frictional area 19 is slightly greater than half the circumference of the clamping nut in extent, and from the outer corners 20 and 21 thereof the nut tapers obliquely to its axis toward a point 22 on the frictional surface 19, to provide the oblique wedge surfaces 23 and 24 which are complementary to the wedge surfaces of the post.

Arched across the wedge surfaces at the lower end of the clamping nut, is an internally threaded boss 25 adapted to receive the correspondingly threaded end 26 of the clamping bolt. The exposed cylindrical surface 27 of the boss extends outwardly beyond the plane of the wedge surfaces 23 and 24, and is so proportioned as to enter the open lower end of the post when the nut is advanced toward the post by tightening the clamping screw 9. By means of this construction, a long internally threaded bearing for the threaded end of the bolt may be provided on the wedge nut, with a substantial saving of weight and bulk of metal. Further saving of metal is effected in the length of the post, while at the same time eliminating weakness and distortion factors ordinarily present in other forms of post ends.

Referring back to the blunt stub end of the steering post, it should be noted that the wedge surfaces 15—16 thereof are very firmly backed up and reinforced by the half-circular lower end of the post, so that an applied force of great magnitude directed against said wedge surfaces, will meet firm and non-yielding resistance, without inducing distortion of the lower end of the post. As a consequence, friction between the contacting areas of the post and the nut, within the hollow fork stem, is magnified and enhanced with a rigidity such as will prevent slippage between the parts. In effect, the structure eliminates flexure or yieldability in those portions of the assembly that are subjected to the strains and stresses of the clamping force. By eliminating flexibility of the post end, and backing up its wedge surfaces with a half-round reinforcement such as is furnished upwardly from the curved peripheral end 12 of the post, a maximum amount of the clamping force is utilized for effecting a positive and firm bearing of the expansible means within the hollow stem of a steering fork. As a result of the construction, it is found impossible to induce slippage rotationally or otherwise, between the post and the hollow stem in which it is expanded once the clamping bolt has been tightened in place.

The internal threads of boss 25 are indicated at 28, and as previously stated herein, the number of threads may be increased to any desired extent by simply elongating the boss in which they are formed, since the boss is so dimensioned that it may enter the open lower end of the post if necessary.

The handle bar clamping means and the arm 6 therefor may be altered or designed in accordance with common practice, as the structure at the upper end of the steering post is immaterial to the present invention. Usually the handle bar clamp is adapted for adjusting the angularity of the handle bars, by providing in association therewith a clamp screw 29 having a head 30 on one of its ends whereby the screw may be advanced into a threaded bore provided in the arm 6, as will be understood.

I claim:

1. In a device of the class described, the combination of a hollow post having an apertured upper end, and a blunt open stub end including a peripheral edge of approximate half-circle extent lying in a plane substantially perpendicular to the longitudinal axis of the post, a pair of wedge surfaces beginning at the terminal ends of said edge and converging to a point on the outer surface of the post, a wedge nut internally threaded and including wedge surfaces complementary to the wedge surfaces of the post, and a bolt having a headed shank received in the aperture of the post, and a threaded end engaging the threads of the wedge nut, for moving the nut in opposite directions lengthwise of the post.

2. In a device of the class described, the combination of a hollow post having an apertured upper end, and a blunt open stub end including a peripheral edge of approximate half-circle extent lying in a plane substantially perpendicular to the longitudinal axis of the post, a pair of wedge surfaces beginning at the terminal ends of said edge and converging to a point on the outer surface of the post, a wedge nut including an internally threaded boss dimensioned to enter the open end of the hollow post, and having wedge surfaces complementary to the wedge surfaces of the post, and a bolt having a headed shank received in the aperture of the post, and a threaded end engaging the threads of the wedge nut boss, for moving the nut in opposite directions lengthwise of the post.

3. In a device of the class described, the combination of a hollow post having an apertured upper end, and a blunt open stub end including a peripheral edge of approximate half-circle extent lying in a plane substantially perpenciular to the longitudinal axis of the post, a pair of wedge surfaces beginning at the terminal ends of said edge and converging to a point on the outer surface of the post, a wedge nut including an internally threaded boss dimensioned to enter the open end of the hollow post, and having oblique wedge surfaces flanking the boss to cooperate with the wedge surfaces of the post, for imparting lateral movement of the nut relative to the post as the nut is advanced lengthwise of the post in one direction, and means engaging the threaded boss for so advancing the nut.

4. In a device of the class described, the combination of a tubular post having a blunt open stub end reinforced by approximately half the circumference of the tubular post, said end being obliquely cut away to provide wedge surfaces terminating at a common point on the outer surface of the post, a wedge nut correspondingly cut away to provide complementary obliquely disposed wedge surfaces to slide upon the wedge surfaces of the post, and means operative upon the wedge nut to move same lengthwise of the post.

5. In a device of the class described, the combination of a tubular post having a blunt open stub end reinforced by approximately half the circumference of the tubular post, said end being obliquely cut away to provide wedge surfaces terminating at a common point on the outer surface of the post, a wedge nut correspondingly cut away to provide complementary obliquely disposed wedge surfaces to slide upon the wedge surfaces of the post, an internally threaded boss on the nut disposed between the wedge surfaces thereof, and means threaded into the boss for moving the nut lengthwise of the bolt.

6. In a device of the class described, the combination of a tubular post having a blunt open stub end reinforced by approximately half the circumference of the tubular post, said end being obliquely cut away to provide wedge surfaces terminating at a common point on the outer surface of the post, a wedge nut correspondingly cut away to provide complementary obliquely disposed wedge surfaces to slide upon the wedge surfaces of the post, an internally threaded boss on the nut disposed between the wedge surfaces thereof, and dimensioned to enter the open end of the post, and means threaded into the boss for moving the nut lengthwise of the bolt.

EWALD F. PAWSAT.